United States Patent
Schiek et al.

(10) Patent No.: US 9,831,745 B2
(45) Date of Patent: Nov. 28, 2017

(54) ELECTRIC MACHINE

(71) Applicant: Dr. Ing. h.c. F. Porsche Aktiengesellschaft, Stuttgart (DE)

(72) Inventors: Werner Schiek, Jettingen (DE); Odon Szinyi, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 673 days.

(21) Appl. No.: 14/135,977

(22) Filed: Dec. 20, 2013

(65) Prior Publication Data

US 2015/0176468 A1    Jun. 25, 2015

(30) Foreign Application Priority Data

Dec. 21, 2012  (DE) .................. 10 2012 112 923

(51) Int. Cl.
  *H02K 9/00*   (2006.01)
  *H02K 9/02*   (2006.01)
  *H02K 5/20*   (2006.01)

(52) U.S. Cl.
  CPC ................. *H02K 9/02* (2013.01); *H02K 5/20* (2013.01)

(58) Field of Classification Search
  CPC .................................. H02K 9/02; H02K 5/20
  USPC ........................................................... 310/58
  See application file for complete search history.

(56) References Cited

U.S. PATENT DOCUMENTS

| | | | | |
|---|---|---|---|---|
| 5,755,378 A | * | 5/1998 | Dage ................. | B60H 1/00814 165/204 |
| 6,570,276 B1 | * | 5/2003 | Morel ..................... | H02K 9/06 310/52 |
| 2009/0026893 A1 | | 1/2009 | Zisler | |
| 2011/0127862 A1 | | 6/2011 | Eichinger et al. | |
| 2011/0140550 A1 | | 6/2011 | Brandl et al. | |
| 2012/0187679 A1 | * | 7/2012 | Takita ..................... | F02B 63/04 290/2 |
| 2012/0206094 A1 | * | 8/2012 | Paetzold .................. | H02P 9/48 320/107 |

FOREIGN PATENT DOCUMENTS

| | | | |
|---|---|---|---|
| CN | 101877512 A | 11/2010 | |
| CN | 102223019 | 10/2011 | |
| CN | 101073190 A | 11/2014 | |
| DE | 195 46 040 A1 | 6/1996 | |
| DE | 10152810 A1 | * 5/2003 | ............... H02K 9/02 |
| JP | S 62-140867 | 9/1987 | |
| JP | 2010022148 | 1/2010 | |
| RU | 2234786 | 8/2004 | |
| RU | 2258295 | 8/2005 | |
| WO | 2010012585 | 2/2010 | |

OTHER PUBLICATIONS

English translation of Abstract of document DE10152810A1.*
First Office Action dated Nov. 17, 2015.
Russian Patent Application No. 2013156304—Office Action.

* cited by examiner

*Primary Examiner* — Helena Kosanovic

(74) *Attorney, Agent, or Firm* — Gerald E. Hespos; Michael J. Porco; Matthew T. Hespos

(57) ABSTRACT

An electric machine is supplied with air for cooling purposes. The electric machine has a housing (40) with cooling ducts for cooling air. To improve and/or simplify the cooling of the electric machine, air-distributing ducts (71) are formed in the housing (40) and emerge from a common air supply duct (70).

12 Claims, 4 Drawing Sheets

ELECTRIC MACHINE

CROSS REFERENCE TO RELATED APPLICATION

This application claims priority under 35 USC 119 to German Patent Appl. No. 10 2012 112 923.1 filed on Dec. 21, 2012, the entire disclosure of which is incorporated herein by reference.

BACKGROUND

Field of the Invention

The invention relates to an electric machine that is supplied with air for cooling purposes. The electric machine has a housing with cooling ducts for the cooling air. The invention also relates to a motor vehicle with an electric machine of this type.

Description of the Related Art

US Patent Application Pub. No. 2011/0127862 discloses an electric machine with a housing that has two end surfaces and a housing interior between the end surfaces. The housing has a lateral area that radially bounds the housing interior. A laminated rotor core has axially running cooling ducts and radially running cooling ducts. The radially running cooling ducts of the laminated rotor core are open radially outward and extend radially inward at least as far as the axially running cooling ducts. Axial ribs bear a laminated stator core that interacts electrically with the laminated rotor core. The laminated rotor core has radially running cooling ducts that are open radially inward and radially outward and interact with the radially running cooling ducts of the laminated rotor core. German laid-open application DE 195 46 040 A1 discloses a power regulation system for an electric motor with a plate. At least one electronic component is disposed on a first surface of the plate and cooling ribs are on the second surface of the plate. An air stream can flow around the cooling ribs. The cooling ribs define an inlet strand to which the air stream can be supplied, and two outlet strands. The outlet strands are connected to the inlet strand and divert the air stream so that the air stream circulates tangentially with respect to the plate along a Y-shaped section.

It is the object of the invention to improve and/or to simplify the cooling of an electric machine.

SUMMARY OF THE INVENTION

The invention relates to an electric machine that is supplied with air for cooling. The electric machine has a housing with cooling ducts for cooling air. Air-distributing ducts are formed in the housing and emerge from a common air supply duct. A volumetric flow of cooling air is supplied to the electric machine via the common air supply duct. The cooling air is distributed and conducted into the housing interior via the air-distributing ducts.

The air supply duct preferably has an oval air supply cross section. As a result, the available construction space can be used optimally. The air supply cross section is substantially in the form of an ellipse with a main axis arranged essentially in a radial direction. The term radially refers to an axis of rotation of the rotor of the electric machine. Radially indicates transversely with respect to the axis of rotation of the rotor.

The air supply duct extends substantially in a circumferential direction. The term circumferential direction likewise refers to the axis of rotation of the rotor. The air supply duct is substantially in the form of an arc of a circle.

The air-distributing ducts preferably lead into air-distributing pockets. Cooling air passes out of the air supply duct into a multiplicity of air-distributing pockets via the air-distributing ducts. Each air-distributing pocket may be assigned an air-distributing duct.

The air-distributing pockets preferably are recessed in an inner base surface of the cup-like housing. The air-distributing pockets can be produced by primary forming, for example by inserting cores into a casting tool.

A first axial end surface of the rotor preferably faces the air-distributing pockets for optimally providing the rotor with cooling air.

A second axial end surface of the rotor preferably is connected to a fan wheel for conjoint rotation. The fan wheel advantageously is designed and arranged in so that the air supplied via the air-distributing pockets flows along the rotor from the first axial end surface of the rotor to the second axial end surface of the rotor.

Air-removing ducts preferably are arranged in the region of the fan wheel. The cooling air advantageously is removed via the fan wheel.

The air-removing ducts preferably extend radially outward. Thus, the cooling air can emerge radially to the outside virtually without obstruction.

The invention also relates to a motor vehicle with an above-described electric machine. The motor vehicle is, for example, an electric vehicle or a hybrid vehicle, in which the electric machine can be used for driving the motor vehicle.

Further advantages, features and details of the invention emerge from the description below in which various exemplary embodiments are described in detail with reference to the drawing.

DETAILED DESCRIPTION OF THE PREFERRED EMBODIMENTS

Figure 1:
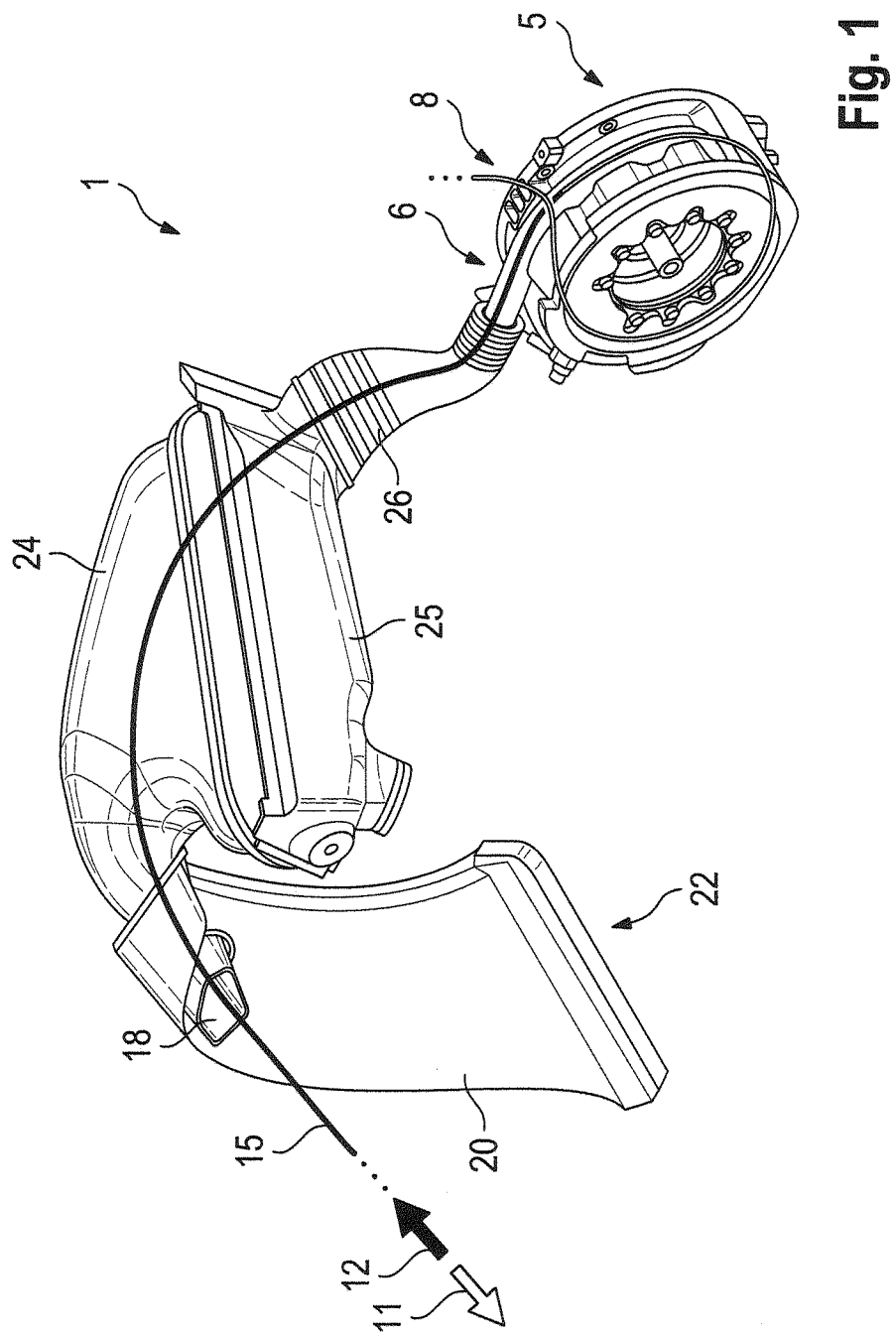
FIG. 1 is a simplified perspective illustration of a motor vehicle with an electric machine that is supplied with air for cooling purposes.

FIG. 1 perspectively illustrates a cooling device 1 for cooling an electric machine 5 with cooling air. The cooling air is supplied to the electric machine 5 via an air inlet 6. The cooling air is heated during operation of the electric machine 5. The heated cooling air emerges from the electric machine at an air outlet 8.

The electric machine 5 is advantageously equipped with a rotating fan wheel, with the aid of which the cooling air can be sucked up via the air inlet 6. An arrow 11 indicates a direction of travel of a motor vehicle 22 equipped with the cooling device 1. Relative wind which is supplied in the form of an air flow 15 to the air inlet 6 is indicated by a further arrow 12.

The air flow 15 passes through an air inlet opening 18, which is provided in or on a bodywork part 20 of the motor vehicle 22, into an air box 24. The air flow passes out of the air box 24 via a clean air shell 25 and a cooling-air connection 26 to the air inlet 8 of the electric machine 5.

A fan wheel of the electric machine 5 constitutes an active flow element and can be used as an alternative or in addition to the relative wind 12 for producing the air-cooling means. The relative wind 12 causes production at the air inlet opening 18 of a positive pressure or dynamic pressure, the influence of which is transmitted to the air box 24 and to the clean air shell 25.

The cooling-air connection 26 is advantageously formed from an elastomer in order to decouple drive train vibrations and relative movements from the bodywork of the motor vehicle 22. Alternatively, the cooling-air connection 26 can comprise a piping, for example made of an elastomer/fabric compound, or a corrugated or flexible pipe.

Figure 2:
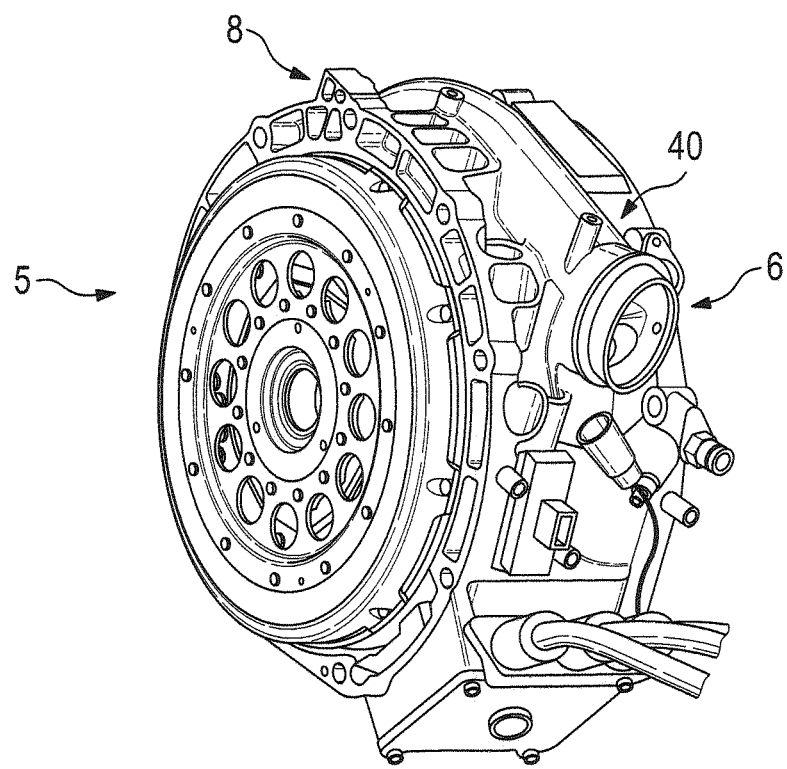
FIG. 2 is an enlarged, rotated illustration of the electric machine of FIG. 1.
Figure 3:
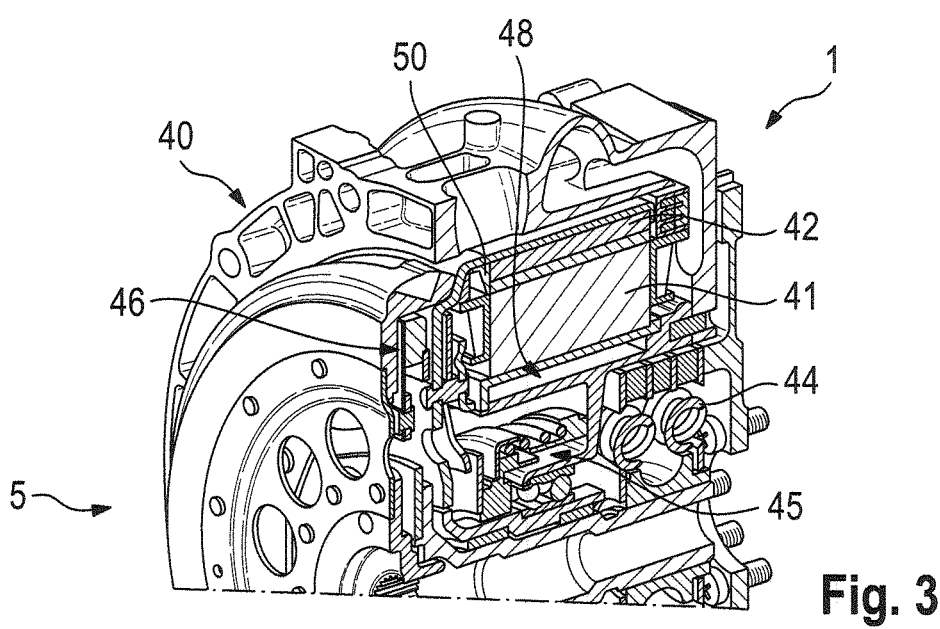
FIG. 3 is a perspective sectional illustration of the electric machine of FIG. 1.

It is seen in FIGS. 2 and 3 that the electric machine 5 comprises a housing 40 with the air inlet 6 and the air outlet 8. A stator 41 and a rotor 42 are arranged in the housing 40. The rotor 42 is arranged radially outside the stator 41. A torsional vibration damper 44 and a disengaging device 45 are arranged radially within the stator 41. The disengaging device 45 serves to actuate a separating coupling 46, which is likewise integrated into the housing 40 of the electric machine 5.

In addition to the air-cooling means, the cooling device 1 of the electric machine 5 comprises a water-cooling means 48 which, for example, comprises a water jacket which is arranged radially within the stator 41. The air-cooling means comprises a fan wheel 50 which, in the exemplary embodiment illustrated, is connected to the rotor 42 of the electric machine 5 for conjoint rotation.

Figure 4:
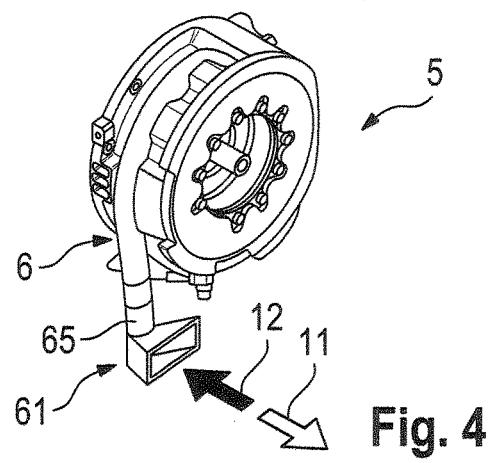
FIGS. 4 to 6 show similar illustrations of the electric machine from FIG. 2 with different air supply devices.
Figure 5:
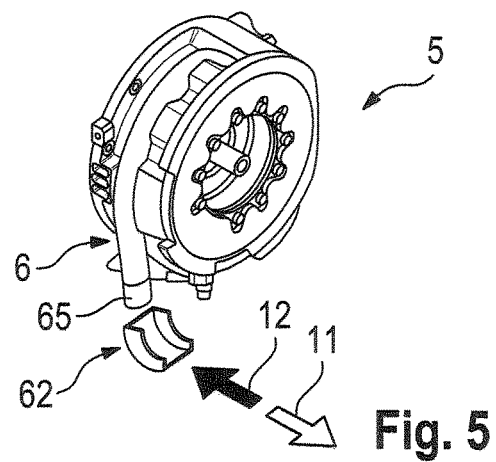
Figure 6:
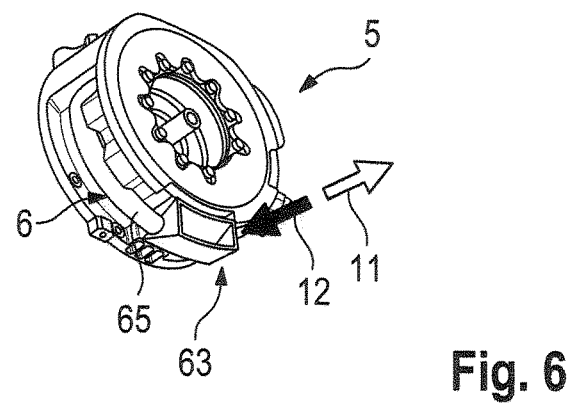

It is illustrated in FIGS. 4 to 6 how air, in particular relative wind 12, can be supplied to the housing 40 of the electric machine 5 with the aid of various air supply devices 61, 62, 63. As in the exemplary embodiment illustrated in FIG. 1, the arrow 11 here in each case represents the direction of travel. The arrow 12 symbolizes the relative wind. The air supply devices 61 to 63 are connected to the air inlet 6 on the electric machine 5 via flexible or rigid air-connecting lines 65.

The air supply device 61 illustrated in FIG. 4 constitutes a type of funnel which is open toward the relative wind 12. The air supply device 61 is integrated, for example, into the bodywork of a motor vehicle equipped with the electric machine 5.

The air supply device 62 illustrated in FIG. 5 is designed in the form of a spoiler, by means of which the relative wind 12 is deflected by approximately 90 degrees. The air supply device 62 is likewise advantageously integrated into the bodywork of the motor vehicle.

The air supply device 63 illustrated in FIG. 6 is designed substantially in the manner of a funnel and is integrated into the housing 40 of the electric machine 5. The air supply device 63 here can advantageously be designed to be pivotable. This affords the advantage that the air supply device 63 can be adapted rapidly and simply to different mounting positions.

If there is a difference in speed between the motor vehicle and the surrounding air, the air flow, indicated by the arrow 12, approaching the vehicle is produced by the relative wind. A significant contribution to the mass flow of cooling air can be achieved by reducing said approaching air flow. This effect can be used separately or in addition to further active flow elements.

Figure 7:
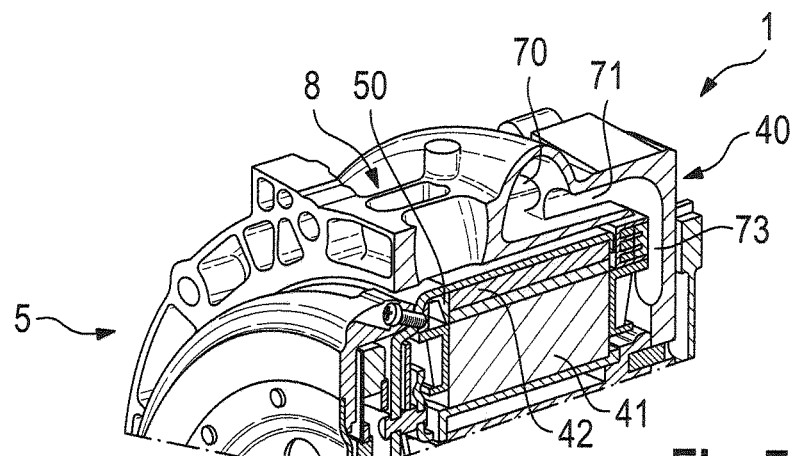
FIG. 7 is an enlarged detail from FIG. 3.
Figure 8:
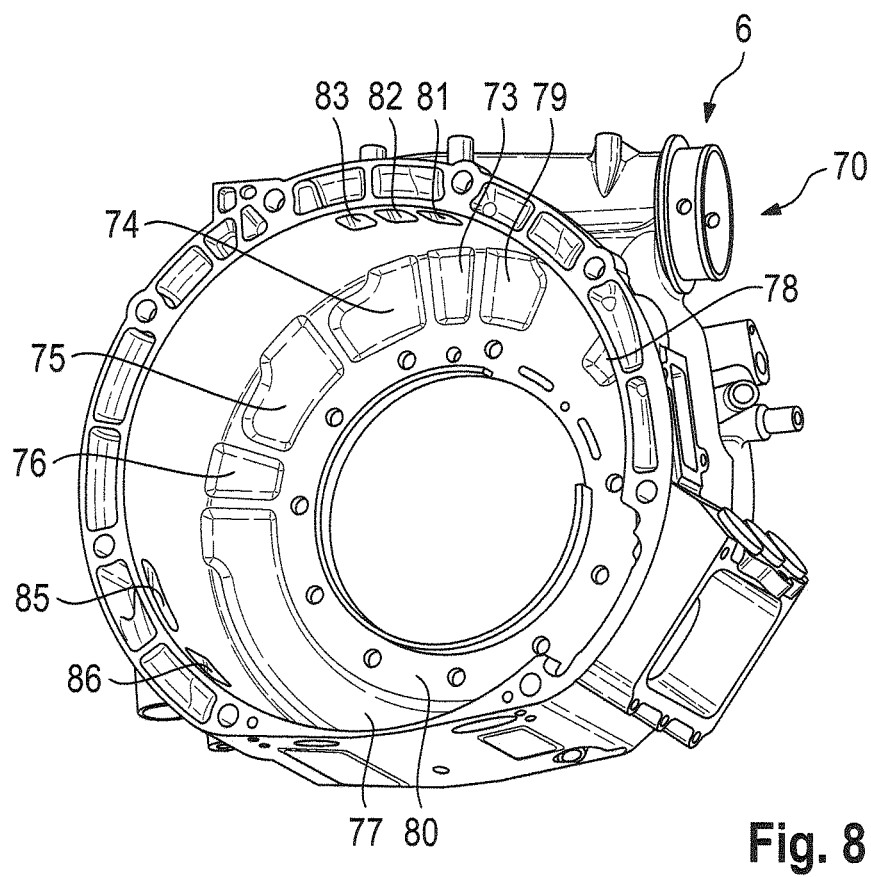
FIG. 8 is a perspective illustration of a housing of the electric machine.

It is seen in FIGS. 7 and 8 that the cooling air is supplied to the housing 40 via an air supply duct 70. The air supply duct 70 has an oval cross section at the air inlet 6. The oval cross section enables the existing construction space to be optimally used.

Air-distributing ducts 71 extend in the axial direction from the air supply duct 70. The term axially refers to an axis of rotation of the rotor. Axially indicates parallel to or in the direction of the axis of rotation of the rotor.

It is seen in FIG. 7 that the air-distributing duct 71 leads into an air-distributing pocket 73. The air-distributing pocket 73 is recessed in a base 80 of the substantially cup-like housing 40.

It is seen in FIG. 8 that a plurality of air-distributing pockets 73 to 79 are recessed in the base 80 of the cup-like housing 40. The air-distributing pockets 73 to 79 have substantially the same extent in the radial direction. The air-distributing pockets 73 to 79 have different extents in the circumferential direction. The air-distributing pocket 77 has the greatest extent in the circumferential direction.

A first axial end surface of the rotor 42 faces the air-distributing pockets 73 to 79. A second axial end surface of the rotor 42 faces away from the air-distributing pockets 73 to 79. The fan wheel 50 is connected to the second axial end face of the rotor 42 for conjoint rotation.

In the region of the fan wheel 50, the housing 40 has air-removing ducts 81 to 86 which extend substantially radially outward through the housing 40. The air heated during operation of the electric machine 5 is removed via the air-removing ducts 81 to 86.

What is claimed is:

1. An electric machine, comprising: a housing, a rotor and a stator disposed in the housing, with the rotor being rotatable relative to the stator around a rotational axis that extends in an axial direction, an air supply duct extending in a circumferential direction in the housing at a position radially outward from both the rotor and the stator, air-distributing ducts formed in the housing and emerging from the air supply duct, the air-distributing ducts extending in the axial direction and being at positions radially outward from both the rotor and the stator, air distributing pockets extending radially in from positions on the air-distributing ducts spaced from the air supply duct, the air-distributing pockets communicating with an axial end of the rotor, and air-removing ducts extending out from the housing at an axial end of the housing spaced from the air-distributing pockets.

2. The electric machine of claim 1, wherein the air-distributing pockets are recessed in an inner base surface of the housing.

3. The electric machine of claim 1, wherein a first axial rotor end surface faces the air-distributing pockets.

4. The electric machine of claim 3, wherein a second axial rotor end surface is connected to a fan wheel for conjoint rotation.

5. The electric machine of claim 4, wherein the air-removing ducts are arranged in a region of the fan wheel.

6. The electric machine of claim 5, wherein the air-removing ducts extend radially outward.

7. A motor vehicle with the electric machine of claim 1.

8. The motor vehicle of claim 7 further comprising a bodywork part with an air inlet opening aligned to face a travel direction of the motor vehicle, at least one cooling air connection providing communication between the air inlet opening in the bodywork part and the air supply duct of the electric machine for providing a flow of cooling air to the electric machine.

9. The electric machine of claim 1, wherein each of the air-distributing pockets have substantially equal radial dimensions.

10. An electric machine, comprising: a housing, a rotor and a stator disposed in the housing, with the rotor being rotatable relative to the stator around a rotational axis that extends in an axial direction, an air supply duct extending in a circumferential direction in the housing at a position radially outward from the rotor, air-distributing ducts formed in the housing and emerging from the air supply duct, the air-distributing ducts extending in the axial direction, air distributing pockets extending radially in from positions on the air-distributing ducts spaced from the air supply duct, the air-distributing pockets communicating with an axial end of the rotor, and air-removing ducts extending out from the housing at an axial end of the housing spaced from the air-distributing pockets, wherein the air-distributing pockets have substantially equal radial dimensions, each of the air-distributing pockets has a circumferential dimension, the circumferential dimension of at least one of the air-distributing pockets being different from the circumferential dimension of at least one other of the air-distributing pockets.

11. The electric machine of claim 1, further comprising an air supply device communicating with the air supply duct and configured for guiding cooling air into the air supply duct.

12. The electric machine of claim 10, wherein the air-distributing ducts are formed in the housing at positions radially outward from both the rotor and the stator.

* * * * *